(12) United States Patent
Minamisawa et al.

(10) Patent No.: US 12,081,871 B2
(45) Date of Patent: Sep. 3, 2024

(54) OPTICAL UNIT WITH SHAKE CORRECTION FUNCTION

(71) Applicant: NIDEC SANKYO CORPORATION, Nagano (JP)

(72) Inventors: Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 85 days.

(21) Appl. No.: 18/083,575

(22) Filed: Dec. 19, 2022

(65) Prior Publication Data

US 2023/0209195 A1     Jun. 29, 2023

(30) Foreign Application Priority Data

Dec. 28, 2021    (JP) ................................. 2021-213626

(51) Int. Cl.
    *H04N 23/68*      (2023.01)
    *H02K 41/035*     (2006.01)

(52) U.S. Cl.
    CPC ....... *H04N 23/685* (2023.01); *H02K 41/0354* (2013.01)

(58) Field of Classification Search
    CPC ...... H04N 23/685; H04N 23/54; H04N 23/57; H04N 23/687; H02K 41/0354; H02K 41/0356; H02K 33/18; G02B 7/00; G02B 27/64; G03B 5/00; G03B 2205/0007

See application file for complete search history.

(56) References Cited

U.S. PATENT DOCUMENTS

| | | | |
|---|---|---|---|
| 11,493,779 B2 | 11/2022 | Minamisawa | |
| 2017/0235155 A1* | 8/2017 | Minamisawa | ..... H02K 41/0356 359/557 |
| 2020/0249421 A1* | 8/2020 | Hu | ..... H04N 23/6812 |

FOREIGN PATENT DOCUMENTS

JP          2020160370         10/2020

\* cited by examiner

*Primary Examiner* — Mekonnen D Dagnew
(74) *Attorney, Agent, or Firm* — JCIPRNET

(57) ABSTRACT

In an optical unit with a shake correction function, a first circuit board, which is pulled out from a camera module, and a second circuit board, on which a first drive coil and a second drive coil are mounted, are electrically connected by a first connection portion and a second connection portion, which are electrically connected while overlapping each other. Moreover, in the optical unit with a shake correction function, a drawer portion of the first circuit board is pulled out toward an outer peripheral side of the optical unit with a shake correction function.

6 Claims, 5 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2021-213626 filed Dec. 28, 2021, the entire content of which is incorporated herein by reference.

FIELD OF THE INVENTION

The disclosure relates to an optical unit with a shake correction function mounted in a mobile device or the like.

BACKGROUND

Optical units with a shake correction function mounted in a mobile device or the like have been known. A conventional optical unit with a shake correction function includes a movable body having an optical module, a gimbal mechanism that supports the movable body, capable of oscillation, a fixed body that supports the movable body via the gimbal mechanism, a drive mechanism for shake correction that oscillates the movable body with respect to the fixed body, a first flexible printed circuit board connected to the movable body, and a second flexible printed circuit board mounted on the fixed body.

In the above optical unit with a shake correction function, the drive mechanism for shake correction has a first magnet and a first coil which rotate the movable body around an X axis and a second magnet and a second coil which rotate the movable body around a Y axis. The first magnet and the first coil are opposed to each other in a Y-axis direction, and the second magnet and the second coil are opposed to each other in an X-axis direction. The fixed body has an outer frame part which surrounds an outer peripheral side of the movable body. An outer shape of the outer frame part seen from an optical axis direction, which is a direction of an optical axis of the optical module, has a regular square shape, and four sides constituting the outer peripheral surface of the outer frame part are parallel to the X-axis direction or to the Y-axis direction.

Moreover, in the above optical unit with a shake correction function, the second flexible printed circuit board has a coil mounting portion in which the first coil and the second coil are mounted and a drawer portion which is connected to the coil mounting portion and is drawn out to the outer peripheral side of the outer frame part of the fixed body. The coil mounting portion is pulled around along one of two sides of the outer frame part in parallel with the X-axis direction and one of two sides in parallel with the Y-axis direction of the outer frame part. The drawer portion is pulled out to the outer peripheral side of the outer frame part toward the one side in the X-axis direction. The first flexible printed circuit board is pulled out to the outer peripheral side of the outer frame part toward the one side in the Y-axis direction. The first flexible printed circuit board pulled out toward the one side in the Y-axis direction is folded back twice.

In the above optical unit with a shake correction function, the first flexible printed circuit board and the second flexible printed circuit board are separately pulled out toward the outer peripheral side of the optical unit with a shake correction function and thus, in a mobile device or the like in which the optical unit with a shake correction function is mounted, a connector to which the first flexible printed circuit board is connected and a connector to which the second flexible printed circuit board is connected need to be provided separately. Therefore, in a mobile device or the like in which the optical unit with a shake correction function is mounted, a space for disposing connectors to electrically connect the optical unit with a shake correction function becomes larger, and there is a concern that a degree of freedom in design of the mobile device or the like in which the optical unit with a shake correction function is installed is lowered.

Moreover, in the above optical unit with a shake correction function, the first flexible printed circuit board, which is pulled out toward the one side in the Y-axis direction, is folded back twice, and since a space for folding back the first flexible printed circuit board is required, there is a concern that a size of the optical unit with a shake correction function becomes larger in a direction orthogonal to the optical axis direction of the optical module.

SUMMARY

An optical unit with a shake correction function of an exemplary embodiment of the disclosure includes a movable body having a camera module, an intermediate member rotatably holding the movable body, a fixed body rotatably holding the intermediate member, a first magnetic drive mechanism and a second magnetic drive mechanism to rotate the movable body with respect to the fixed body so that an optical axis of the camera module is inclined in an arbitrary direction, and a first circuit board and a second circuit board at least a part of which is constituted by a flexible printed circuit board, in which the first magnetic drive mechanism includes a first drive magnet and a first drive coil disposed to face each other in a first direction orthogonal to the optical axis of the camera module when the optical axis of the camera module is at a predetermined reference position, the second magnetic drive mechanism includes a second drive magnet and a second drive coil disposed to face each other in a second direction orthogonal to the optical axis of the camera module and the first direction when the optical axis of the camera module is at the reference position, the fixed body includes an intermediate member holder rotatably holding the intermediate member, the first circuit board is pulled out from the camera module, the first drive coil and the second drive coil are mounted on the second circuit board, the first circuit board includes a first band-shaped portion provided having an elongated band shape and a first connection portion to electrically connect the first circuit board and the second circuit board, the second circuit board includes a second band-shaped portion provided having an elongated band shape and a second connection portion to electrically connect the first circuit board and the second circuit board, the first circuit board or the second circuit board includes a drawer portion to be pulled out toward an outer peripheral side of the fixed body, as viewed from an optical axis direction being a direction of the optical axis of the camera module, when the optical axis of the camera module is at the reference position, an outer shape of the intermediate member holder has a regular-square shape or a rectangular shape, and four sides constituting an outer peripheral surface of the intermediate member holder are parallel to the first direction or the second direction, and supposing that one of two sides of the intermediate member holder in parallel with the first direction is a first side, the other side of the two sides of the intermediate member holder in parallel with the first direction is a second side, one of two sides of the intermediate member holder in parallel with the second direction is a third side, and the other side of the two sides of the intermediate member holder in parallel with the second direction is a fourth side, the optical axis direction when the optical axis of the camera module is at the reference position and a width direction of the first band-shaped portion are in parallel, the first band-shaped portion is pulled around along the first side and the third side, the optical axis direction when the optical axis of the camera module is at the reference position and a width direction of the second band-shaped portion are in parallel, the second band-shaped portion is pulled around along the second side and the fourth side, and the first connection portion and the second connection portion are either electrically connected while overlapping each other in the second direction on the first side or the second side or electrically connected while overlapping each other in the first direction on the third side or the fourth side.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

In the following, embodiments of at least embodiments of the disclosure will be described with reference to the drawings.

Figure 1:
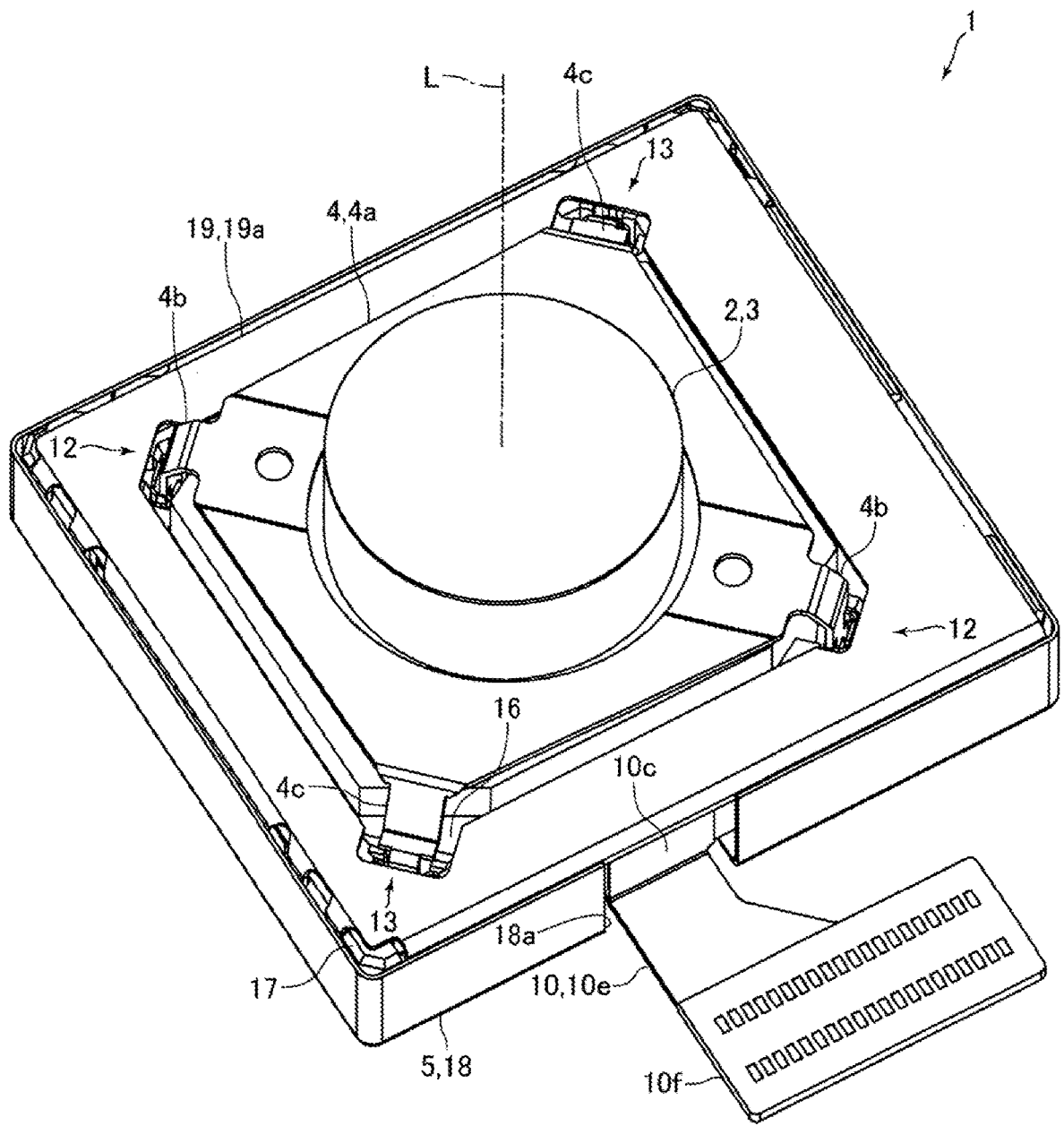
FIG. 1 is a perspective view of an optical unit with a shake correction function according to an embodiment of at least an embodiment of the disclosure.
Figure 2:
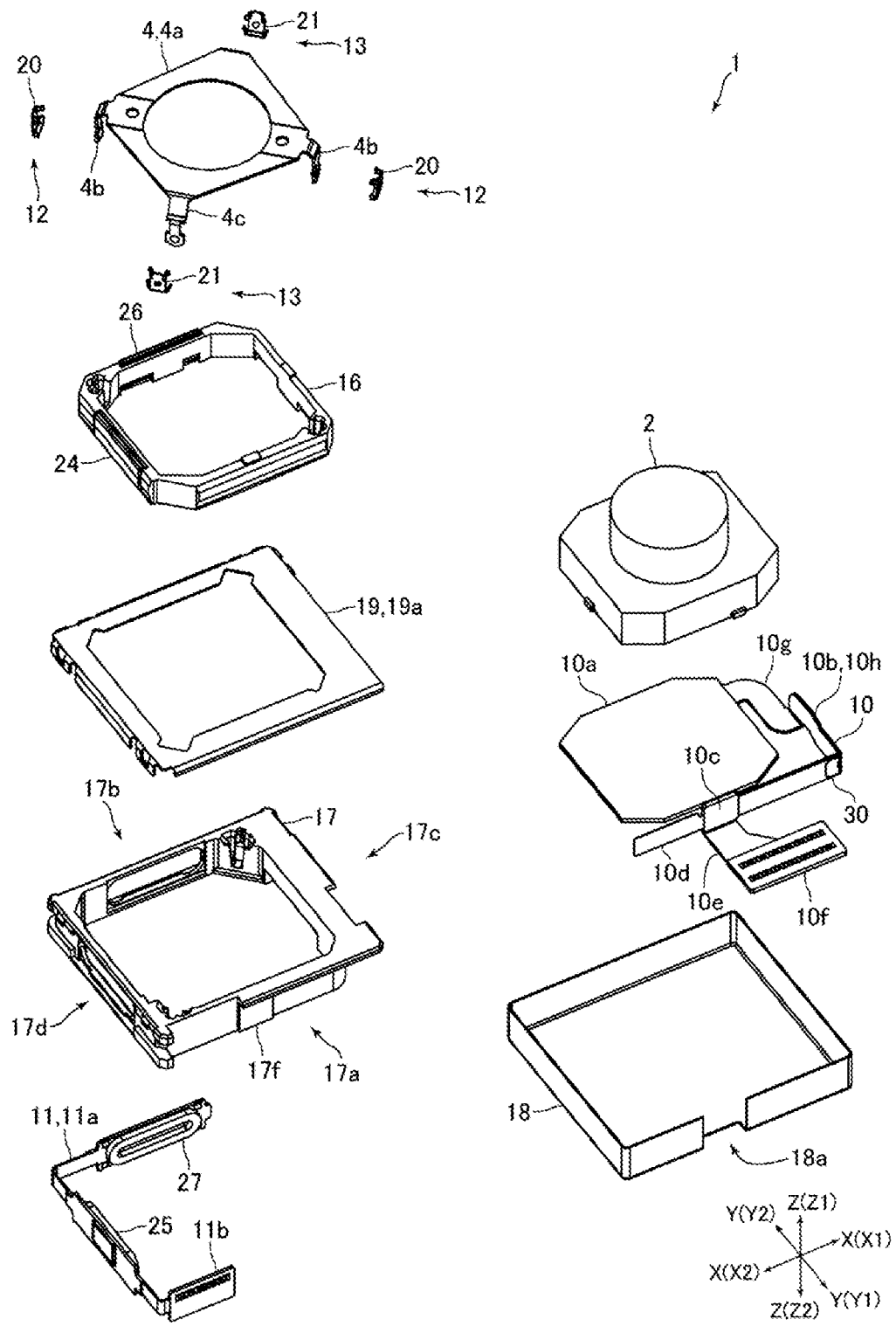
FIG. 2 is an exploded perspective view of the optical unit with a shake correction function shown in FIG. 1.
Figure 3:
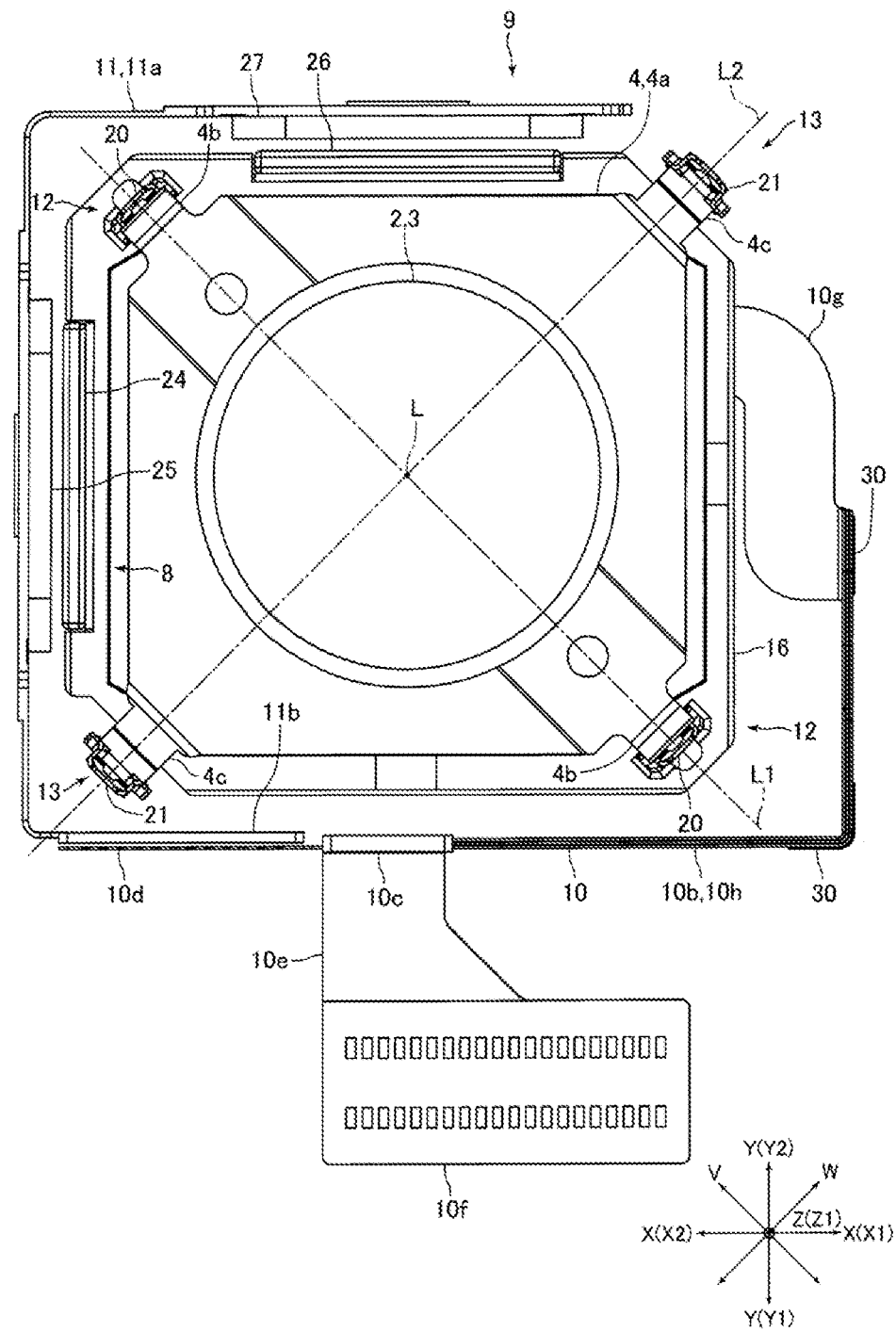
FIG. 3 is a plan view of a state where a fixed body is removed from the optical unit with a shake correction function shown in FIG. 1.

FIG. 1 is a perspective view of an optical unit 1 with a shake correction function according to an embodiment of at least an embodiment of the disclosure. FIG. 2 is an exploded perspective view of the optical unit 1 with a shake correction function shown in FIG. 1. FIG. 3 is a plan view of a state where a fixed body 5 is removed from the optical unit 1 with a shake correction function shown in FIG. 1.

In the following explanation, as shown in FIG. 1 and the like, each of three directions orthogonal to one another is referred to as an X-direction, a Y-direction, and a Z-direction, and the X-direction is referred to as a left-right direction, the Y-direction as a front-back direction, and the Z-direction as an up-down direction. Furthermore, an X1-direction side in FIG. 1 and the like, which is one direction side in the left-right direction, is referred to as a "right" side, while an X2-direction side in FIG. 1 and the like, which is a direction on a side opposite thereto, as a "left" side, a Y1-direction side in FIG. 1 and the like, which is one direction side in the front-back direction, as a "front" side, while a Y2-direction side in FIG. 1 and the like, which is a direction on a side opposite thereto, as a "back" side, and a Z1-direction side in FIG. 1 and the like, which is one direction side in the up-down direction, as an "upper" side, while a Z2-direction side in FIG. 1 and the like, which is a direction on a side opposite thereto, as a "lower" side.

The optical unit 1 with a shake correction function of this embodiment (hereinafter referred to as an "optical unit 1") is a small-sized and thin unit to be mounted in a mobile device such as a smartphone, for example, and includes a camera module 2 having a lens for photographing and an image pickup element. The optical unit 1 includes a shake correction function to avoid disturbances in a photographed image when a shake occurs during photographing. The optical unit 1 is provided having a thin and flat cuboid shape as a whole. The optical unit 1 in this embodiment is provided to have a regular-square shape when viewed from the optical axis direction, which is the direction of an optical axis L of the camera module 2. Four side surfaces of the optical unit 1 are parallel to a ZX plane, which is constituted by the left-right direction and the up-down direction or a YZ plane, which is constituted by the front-back direction and the up-down direction.

The optical unit 1 has a movable body 3 having the camera module 2, an intermediate member 4 that rotatably holds the movable body 3, and a fixed body 5 that rotatably holds the intermediate member 4 (see FIG. 1). The movable body 3 is able to be be rotated with respect to the intermediate member 4 with a first crossing direction (direction V in FIG. 3) that intersects the optical axis L of the camera module 2 as an axis direction of rotation. In other words, the movable body 3 is rotatable with respect to the intermediate member 4 around a first axis L1 (see FIG. 3) with the first crossing direction as the axial direction. The first crossing direction in this embodiment is orthogonal to the optical axis L.

The intermediate member 4 is able to be rotated with respect to the fixed body 5 with a second crossing direction (W-direction in FIG. 3), which intersects the first crossing direction and intersects the optical axis L of the camera module 2, as the axial direction of rotation. In other words, the intermediate member 4 is able to be rotated with respect to the fixed body 5 with a second axis L2 (see FIG. 3), which has the second crossing direction as its axis direction, as a rotation center. In this embodiment, the second crossing direction is orthogonal to the first crossing direction. As described above, a two-axis gimbal mechanism is constituted between the movable body 3 and the fixed body 5.

In this embodiment, when no current is supplied to a first drive coil 25 and a second drive coil 27 described below, the movable body 3 and the intermediate member 4 are disposed at predetermined reference positions, and the optical axis L of the camera module 2 is disposed at a predetermined reference position. When the movable body 3 and the intermediate member 4 are disposed at the reference positions and the optical axis L of the camera module 2 is at the reference position, the optical axis direction of the camera module 2 matches the up-down direction. The left-right direction (X-direction) in this embodiment is the first direction orthogonal to the optical axis L of the camera module 2 when the optical axis L of the camera module 2 is at the reference position. Moreover, the front-back direction (Y-direction) is the second direction orthogonal to the left-right direction, which is the first direction, and the optical axis L of the camera module 2 when the optical axis L of the camera module 2 is at the reference position.

Moreover, when the movable body 3 is disposed at the predetermined reference position, the second crossing direction (W-direction) is orthogonal to the optical axis L. In other words, when the movable body 3 is disposed at the predetermined reference position and is not rotated with respect to the intermediate member 4, the second crossing direction is orthogonal to the optical axis L. On the other hand, when the movable body 3 is rotated with respect to the intermediate member 4, the second crossing direction intersects the optical axis L, but not at a right angle. The second crossing direction (W-direction) is a direction shifted in a clockwise direction in FIG. 3 by approximately 45° with respect to the front-back direction when viewed from above.

The optical unit 1 includes a first magnetic drive mechanism 8 and a second magnetic drive mechanism 9 to rotate the movable body 3 with respect to the fixed body 5 so that the optical axis L of the camera module 2 is inclined in an arbitrary direction (see FIG. 3). Moreover, the optical unit 1 also includes a first circuit board 10, which is pulled out from the camera module 2, and a second circuit board 11 on which the first drive coil 25, which will be described below and constitutes a part of the first magnetic drive mechanism 8, and the second drive coil 27, which will be described below and constitutes a part of the second magnetic drive mechanism 9, are mounted. A first fulcrum portion 12, which is a fulcrum of rotation of the movable body 3 with respect to the intermediate member 4, is disposed at both end parts of the intermediate member 4 in the first crossing direction. A second fulcrum portion 13, which is a fulcrum of rotation of the intermediate member 4 with respect to the fixed body 5, is disposed at both end parts of the intermediate member 4 in the second crossing direction.

The movable body 3 is provided having a substantially cuboid shape, which is flat and small in thickness in the optical axis direction as a whole. The movable body 3 has a holder 16 to which the camera module 2 is fixed. The holder 16 is provided of a resin material. The holder 16 is provided having a regular-square frame shape, and when viewed from the optical axis direction in a state where the movable body 3 and intermediate member 4 are disposed at the reference position, an outer shape of the holder 16 has a regular-square shape. Moreover, when the movable body 3 and the intermediate member 4 are disposed at the reference positions, two of the four sides that constitute the outer peripheral surface of the holder 16, which has a regular-square outer shape, are parallel to the front-back direction, and the remaining two sides are parallel to the left-right direction.

The camera module 2 is fixed to an inner peripheral surface of the holder 16 so that the outer peripheral side of the camera module 2 is covered by the holder 16. As described above, the camera module 2 includes a lens and an image pickup element. The image pickup element is disposed on a lower end side of the camera module 2, and a subject disposed on an upper side of the camera module 2 is photographed by the camera module 2.

The intermediate member 4 is provided of a metal material such as stainless steel. Moreover, the intermediate member 4 is a plate spring defined by a metal plate having a spring characteristic bent into a predetermined shape. The intermediate member 4 is constituted by a base portion 4a that is disposed above the holder 16, two arm portions 4b that extend from the base portion 4a toward both sides in the first crossing direction, and two arm portions 4c that extend from the base portion 4a toward the both sides in the second crossing direction. The base portion 4a is provided having a substantially regular-square frame shape. An upper end part of the camera module 2 is disposed on an inner peripheral side of the base portion 4a.

Distal end sides of the arm portions 4b and 4c are bent toward lower sides. The arm portions 4b are disposed on the inner peripheral side of the holder 16. The arm portions 4c are disposed on the outer peripheral side of the holder 16. Moreover, the arm portions 4c are disposed on the inner peripheral side of the case body 17, which will be described below, which constitutes a part of the fixed body 5. A hemispherical recess part in which a part of a spherical body that constitutes a part of the first fulcrum portion 12 is disposed is provided on the distal end part of the arm portion 4b. A hemispherical recess part in which a part of a spherical body that constitutes a part of the second fulcrum portion 13 is disposed is provided on the distal end part of the arm portion 4c.

The fixed body 5 includes the frame-shaped case body 17 that is disposed on an outer side of the movable body 3 and the intermediate member 4, a cover member 18 which covers a side surface and a lower surface of the case body 17, and a cover member 19 which covers an upper surface of the case body 17. The case body 17 is provided of a resin material. The intermediate member 4 is rotatably held in the case body 17. The case body 17 in this embodiment is an intermediate member holder that rotatably holds the intermediate member 4.

The case body 17 is provided having a flat square-cylinder shape with openings at both ends in the up-down direction. The shape of the case body 17 when viewed from the up-down direction has a regular-square frame shape. In other words, when the optical axis L of the camera module 2 is at the reference position, the outer shape of the case body 17 has a regular-square shape when viewed from the optical axis direction of the camera module 2. When viewed from the up-down direction, two sides of the four sides that constitute the outer peripheral surface of the case body 17, which has a regular-square outer shape, are parallel to the front-back direction, while the remaining two sides are parallel to the left-right direction. In other words, when viewed from the up-down direction, the four sides that constitute the outer peripheral surface of the case body 17 are parallel to the front-back direction or the left-right direction.

The cover member 18 is provided having a square-cylinder shape with a bottom having a bottom part that is provided as a flat square plate and a cylindrical part having a square-cylinder shape that rises upward from the bottom part. An outer shape of the cover member 18 when viewed from the up-down direction is a regular square. When viewed from the up-down direction, two sides of the four sides that constitute the outer peripheral surface of the cover member 18, which has a regular-square outer shape, are parallel to the front-back direction, while the remaining two sides are parallel to the left-right direction. The cover member 18 constitutes a lower surface and a side surface of the optical unit 1. In the cover member 18, a notch portion 18a to pull out the first circuit board 10 to the outer peripheral side of the optical unit 1 is provided. The notch portion 18a is provided in the front end part and in the front side surface part of the bottom part of the cover member 18. Moreover, the notch portion 18a is provided in the center part in the left-right direction of the cover member 18.

A cover member 19 is mainly constituted by a flat plate-shaped covering portion 19a that covers an upper surface of the case body 17. The covering portion 19a is provided having a regular-square frame shape. An outer shape of the cover member 19 when viewed from the up-down direction is a regular square. When viewed from the up-down direction, two sides of the four sides that constitute the outer peripheral surface of the cover member 19, which has a regular-square outer shape, are parallel to the front-back direction, while the remaining two sides are parallel to the left-right direction. The camera module 2 and a part of the intermediate member 4 are disposed on the inner peripheral side of the covering portion 19a.

The first fulcrum portion 12 includes a support member 20 fixed to the holder 16 and a spherical body that is fixed to the support member 20. A part of the spherical body fixed to the support member 20 is disposed in the recess part provided at a distal end part of the arm portion 4b. The spherical body is in contact with a bottom surface of the recess part of the arm portion 4b from the outer side in the first crossing direction with a predetermined contact pressure by the spring characteristic of the arm portion 4b. The second fulcrum portion 13 includes a support member 21 fixed to the case body 17 and a spherical body fixed to the support member 21. A part of the spherical body fixed to the support member 21 is disposed in the recess part provided at a distal end part of the arm portion 4c. The spherical body is in contact with a bottom surface of the recess part of the arm portion 4c from the outer side in the second crossing direction with a predetermined contact pressure by the spring characteristic of the arm portion 4c.

The first magnetic drive mechanism 8 includes a first drive magnet 24 and the first drive coil 25 that are disposed to face each other in the left-right direction. The second magnetic drive mechanism 9 includes a second drive magnet 26 and the second drive coil 27 that are disposed to face each other in the front-back direction. The first drive magnet 24 and the second drive magnet 26 are provided having a rectangular flat-plate shape. The first drive coil 25 and the second drive coil 27 are, for example, air-core coils defined by a conductor wound around an air-core.

The first drive magnet 24 is disposed in a recess part provided in a left side surface of the holder 16 and is fixed to a left surface side of the holder 16. The first drive coil 25 is disposed in a through hole defined in the left surface part of the case body 17. Moreover, the first drive coil 25 is mounted on the second circuit board 11. The first magnetic drive mechanism 8 rotates the movable body 3 with respect to the fixed body 5 with an axis orthogonal to the optical axis L of the camera module 2 and parallel to the front-back direction as the rotation center.

The second drive magnet 26 is disposed in a recess part provided in a rear side surface of the holder 16 and is fixed to a rear surface side of the holder 16. The second drive coil 27 is disposed in a through hole defined in the rear side part of the case body 17. Moreover, the second drive coil 27 is mounted on the second circuit board 11. The second magnetic drive mechanism 9 rotates the movable body 3 with respect to the fixed body 5 with an axis orthogonal to the optical axis L of the camera module 2 and parallel to the left-right direction as the rotation center.

In the optical unit 1, when a change in inclination of the movable body 3 is detected by a predetermined detection mechanism to detect the change in the inclination of the movable body 3, an electric current is supplied to at least either one of the first drive coil 25 and the second drive coil 27 on the basis of a detection result of the detection mechanism, and a shake is corrected. The first magnetic drive mechanism 8 and the second magnetic drive mechanism 9 rotate the movable body 3 with respect to the fixed body 5 by using at least either one of the first axis L1 and the second axis L2 as the rotation center.

Figure 4:
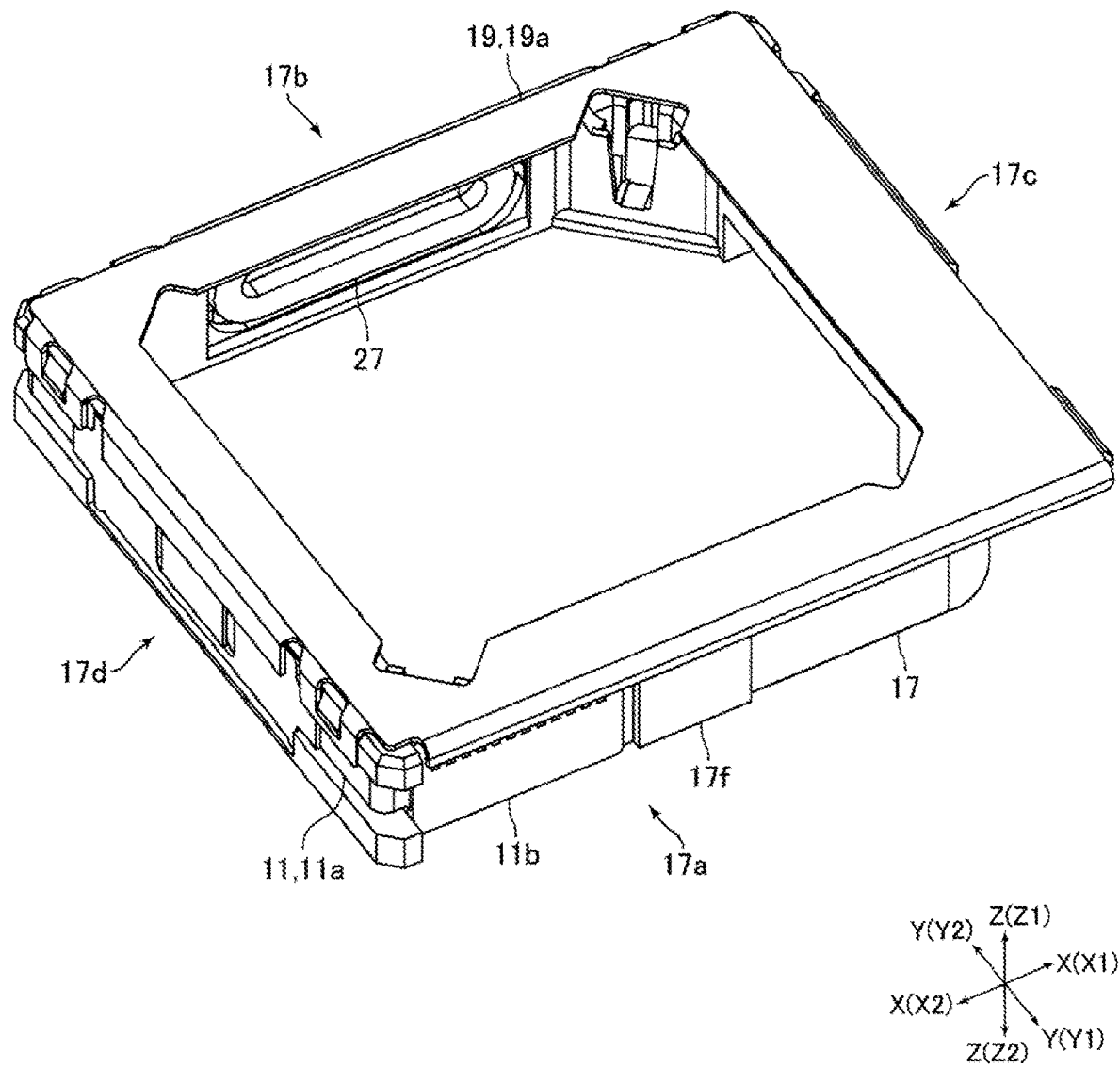
FIG. 4 is a perspective view illustrating a case body, a cover member, a second circuit board and the like shown in FIG. 1, extracted.
Figure 5:
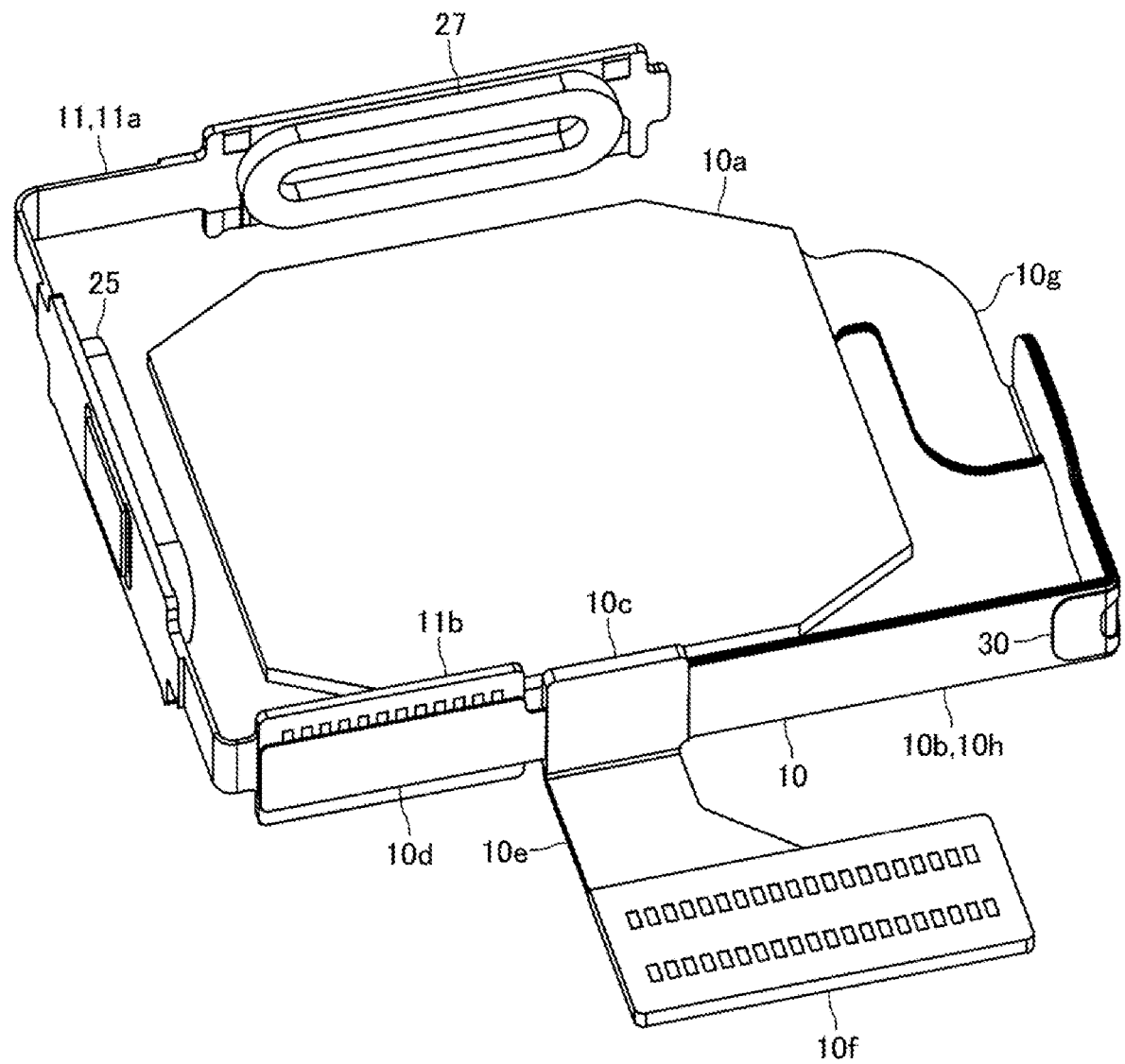
FIG. 5 is a perspective view illustrating a first circuit board and the second circuit board and the like shown in FIG. 3, extracted.

FIG. 4 is a perspective view illustrating the case body 17, the cover member 19, the second circuit board 11 and the like shown in FIG. 1, extracted. FIG. 5 is a perspective view illustrating the first circuit board 10 and the second circuit board 11 and the like shown in FIG. 3, extracted.

The first circuit board 10 is a rigid-flexible board in which a flexible printed circuit board and a rigid board are integrated, and a part of the first circuit board 10 is constituted by the flexible printed circuit board. Moreover, the first circuit board 10 is constituted by a first board portion 10a that is fixed to a lower surface of the camera module 2, a second board portion 10b having one end part connected to the first board portion 10a, a third board portion 10c connected to the other end part of the second board portion 10b, a fourth board portion 10d and a fifth board portion 10e having one end parts connected to the third board portion 10c, and a sixth board portion 10f connected to the other end part of the fifth board portion 10e.

The first board portion 10a, the second board portion 10b, the third board portion 10c, the fourth board portion 10d, the fifth board portion 10e, and the sixth board portion 10f are provided integrally. The first board portion 10a, the third board portion 10c, and the sixth board portion 10f are constituted by a flexible printed circuit board and a rigid board. The second board portion 10b, the fourth board portion 10d, and the fifth board portion 10e are constituted by a flexible printed circuit board.

As described above, when viewed from the up-down direction, two sides of the four sides that constitute the outer peripheral surface of the case body 17 are parallel to the left and right directions, while the remaining two sides are parallel to the front-back direction. In the following explanation, one side of the two sides of the case body 17 parallel to the left-right direction is referred to as a first side 17a, the other side of the two sides of the case body 17 parallel to the left-right direction as a second side 17b, one side of the two sides of the case body 17 parallel to the front-back direction as a third side 17c, and the other side of the two sides of the case body 17 parallel to the front-back direction as a fourth side 17d (see FIGS. 2 and 4). Specifically, the side on the front side of the case body 17 when viewed from the up-down direction is referred to as the first side 17a, the side on the rear side of case body 17 when viewed from the up-down direction as the second side 17b, the side on the right side of case body 17 when viewed from the up-down direction as the third side 17c, and the side on the left side of the case body 17 when viewed from below as the fourth side 17d.

The first board portion 10a is fixed to the lower surface of the camera module 2, as described above. The first board portion 10a is disposed so that a thickness direction of the first board portion 10a matches the up-down direction. An image pickup element is mounted on an upper surface of the first board portion 10a. The second board portion 10b is pulled out from the first board portion 10a. The second board portion 10b is pulled out from the first board portion 10a toward the right side, pulled around toward the front side and then, pulled around toward the left side.

The second board portion 10b is constituted by a drawer portion 10g having a left end part connected to the first board portion 10a and a first band-shaped portion 10h having a rear end part connected to a right end part of the drawer portion 10g. As described above, since the second board portion 10b is constituted by a flexible printed circuit board, the drawer portion 10g and the first band-shaped portion 10h are constituted by flexible printed circuit boards. The drawer portion 10g is disposed so that the thickness direction of the drawer portion 10g matches the up-down direction. On a boundary between the drawer portion 10g and the first band-shaped portion 10h, the second board portion 10b is bent by 90° toward the upper side. In the second board portion 10b, two pieces of two-layer flexible printed circuit boards with wiring patterns provided on both surfaces overlap each other through a gap.

The first band-shaped portion 10h is provided having an elongated band shape. The first band-shaped portion 10h is disposed so that the width direction of the first band-shaped portion 10h matches the up-down direction In other words, when the optical axis L of the camera module 2 is at the reference position, the optical axis direction of the camera module 2 is parallel to the width direction of the first band-shaped portion 10h. The first band-shaped portion 10h is pulled around on the outer peripheral side of the case body 17. Moreover, the first band-shaped portion 10h is also pulled around along the first side 17a and the third side 17c. In other words, the first band-shaped portion 10h in a standing state is pulled around along the first side 17a and the third side 17c.

Also, the first band-shaped portion 10h is pulled from the center part in the front-back direction of the third side 17c toward the front side to the front end of the third side 17c and bent by 90° and then, is pulled around to the center part in the left-right direction of the first side 17a toward the left side. The thickness direction of a part pulled around along the third side 17c of the first band-shaped portion 10h matches the left-right direction, and the thickness direction of a part pulled around along the first side 17a of the first band-shaped portion 10h matches the front-back direction.

On a boundary between the part pulled around along the first side 17a of the first band-shaped portion 10h and the part pulled around along the third side 17c, a thin reinforcing plate 30 for maintaining the shape of the first band-shaped portion 10h is fixed. The reinforcing plate 30 is provided having an L shape. Similarly, also on a boundary between the drawer portion 10g and the first band-shaped portion 10h, the thin reinforcing plate 30 (see FIG. 3) for maintaining the shape of the second board portion 10b is fixed. A gap is provided between the first band-shaped portion 10h and the side surface of the case body 17, and the first band-shaped portion 10h is not fixed to the case body 17.

The third board portion 10c is disposed so that the thickness direction of the third board portion 10c matches the front-back direction. The third board portion 10c is fixed to the case body 17 on the first side 17a. Specifically, the third board portion 10c is fixed to the outer side surface of the case body 17 at the center part of the first side 17a in the left-right direction. A board fixing portion 17f protruding toward the front side is provided on the front side surface of the case body 17. The third board portion 10c is fixed to the board fixing portion 17f. A left end part of the first band-shaped portion 10h is connected to a right end part of the third board portion 10c.

The fourth board portion 10d is provided having a band shape with the left-right direction as a longitudinal direction. The fourth board portion 10d is disposed so that the thickness direction of the fourth board portion 10d matches the front-back direction, and the width direction of the fourth board portion 10d is parallel to the up-down direction. The fourth board portion 10d is constituted by a single-layer flexible printed circuit board with a wiring pattern provided only on one side. A right end part of the fourth board portion 10d is connected to a left end part of the third board portion 10c. The fourth board portion 10d is disposed along the first side 17a.

The fifth board portion 10e is pulled out toward the front side from the third board portion 10c. The fifth board portion 10e is disposed so that a thickness direction of the fifth board portion 10e matches the up-down direction. A rear end part of the fifth board portion 10e is connected to a lower end part of the third board portion 10c. The fifth board portion 10e is drawn out from the center part in the left-right direction of the first side 17a toward the front side, which is one side in the front-back direction. In other words, the fifth board portion 10e is pulled out toward the outer peripheral side of the fixed body 5. The fifth board portion 10e has been pulled out so as to pass through the notch portion 18a of the cover member 18, and a part of the fifth board portion 10e is disposed in the notch portion 18a. The fifth board portion 10e in this embodiment is a drawer portion that is pulled out toward the outer peripheral side of the fixed body 5.

The sixth board portion 10f is disposed so that a thickness direction of the sixth board portion 10f matches the up-down direction. The sixth board portion 10f is connected to a front end part of the fifth board portion 10e. The sixth board portion 10f is connected to a connector provided inside a mobile device such as a smartphone or the like on which the optical unit 1 is mounted.

The second circuit board 11 is a flexible printed circuit board. In other words, the entire second circuit board 11 is constituted by a flexible printed circuit board. Moreover, the second circuit board 11 is also constituted by a second band-shaped portion 11a, which is provided having an elongated band shape, and the board portion 11b connected to the second band-shaped portion 11a. The second band-shaped portion 11a and the board portion 11b are constituted by flexible printed circuit boards.

The second band-shaped portion 11a is disposed so that the width direction of the second band-shaped portion 11a matches the up-down direction. In other words, when the optical axis L of the camera module 2 is at the reference position, the optical axis direction of the camera module 2 is parallel to the width direction of the second band-shaped portion 11a. The second band-shaped portion 11a is pulled around on the outer peripheral side of the case body 17. Moreover, the second band-shaped portion 11a is also pulled around along the second side 17b and the fourth side 17d. In other words, the second band-shaped portion 11a in a standing state is pulled around along the second side 17b and the fourth side 17d.

Also, the second band-shaped portion 11a is pulled around from the right end side of the second side 17b toward the left side to the left end of the second side 17b and bent by 90° and then, is pulled around to the front end of the fourth side 17d along the fourth side 17d. A thickness direction of a part pulled around along the second side 17b of the second band-shaped portion 11a matches the front-back direction, and the thickness direction of a part pulled around along the fourth side 17d of the second band-shaped portion 11a matches the left-right direction. The second band-shaped portion 11a is fixed to the outer peripheral surface of the case body 17.

The board portion 11b is provided having a band shape with the left-right direction as a longitudinal direction. The board portion 11b is disposed so that the width direction of the board portion 11b matches the up-down direction, and the width direction of the board portion 11b is parallel to the up-down direction. A left end of the board portion 11b is connected to the front end of the second band-shaped portion 11a. The board portion 11b is pulled around along the first side 17a. In addition, the board portion 11b is pulled around from the left end of the first side 17a toward the center in the left-right direction of the first side 17a.

The fourth board portion 10d of the first circuit board 10 and the board portion 11b are electrically connected while overlapping each other in the front-back direction on the first side 17a. Specifically, the fourth board portion 10d and the board portion 11b are electrically connected in the state where they overlap each other on the first side 17a closer to the left side than the fifth board portion 10e. The fourth board portion 10d and the board portion 11b are soldered and fixed to each other. The fourth board portion 10d and board portion 11b serve a function of electrically connecting the first circuit board 10 and the second circuit board 11.

The fourth board portion 10d in this embodiment is the first connection portion to electrically connect the first circuit board 10 and the second circuit board 11, and the board portion 11b is the second connection portion to electrically connect the first circuit board 10 and the second circuit board 11. In addition, the third board portion 10c in this embodiment is a connecting portion where the end part of the first band-shaped portion 10h, the end part of the fourth board portion 10d, which is the first connection portion, and the end part of the fifth board portion 10e, which is the drawer portion are connected.

The board portion 11b is disposed on a rear side of the fourth board portion 10d. In other words, the board portion 11b is disposed closer to the case body 17 side than the fourth board portion 10d in the front-back direction. Solder lands are provided on the rear surface of the fourth board portion 10d and on the front surface of the board portion 11b for soldering the fourth board portion 10d and the board portion 11b. The rear surface of the fourth board portion 10d is in contact with the front surface of the board portion 11b.

Rigidity of the board portion 11b is higher than rigidity of the fourth board portion 10d. For example, the board portion 11b is constituted by a four-layer flexible printed circuit board, and the rigidity of the board portion 11b is higher than the rigidity of the fourth board portion 10d, which is constituted by a single-layer flexible printed circuit board. In addition, on the rear surface of the board portion 11b, a reinforcing plate of approximately 0.1 to 0.2 (mm) may be bonded, whereby the rigidity of the board portion 11b becomes higher than the rigidity of the fourth board portion 10d.

When the optical unit 1 is to be assembled, components other than the camera module 2, the first circuit board 10, and the cover member 18 are assembled first. Then, the camera module 2 in a state where the first circuit board 10 is fixed is assembled. At this time, the fourth board portion 10d is soldered to the board portion 11b from the front side for connection. In order to facilitate a soldering work of the fourth board portion 10d to the board portion 11b, the board portion 11b is exposed on the front side of the case body 17, when cover member 18 is removed (see FIG. 4). When the camera module 2 in the state where the first circuit board 10 is fixed is assembled, the cover member 18 is mounted, and the assembling of the optical unit 1 is completed.

As described above, in this embodiment, the first circuit board 10, which is pulled out from the camera module 2, and the second circuit board 11 on which the first drive coil 25 and the second drive coil 27 are mounted are electrically connected by the fourth board portion 10d and the board portion 11b. Also, in this embodiment, the fifth board portion 10e is pulled out toward the outer peripheral side of the fixed body 5. Furthermore, in this embodiment, the sixth board portion 10f is connected to the end part of the fifth board portion 10e, and the sixth board portion 10f is connected to a connector provided inside the mobile device in which the optical unit 1 is mounted.

Thus, in this embodiment, by providing a connector to which the sixth board portion 10f is connected in the mobile device in which the optical unit 1 is mounted, the first circuit board 10 and the second circuit board 11 are able to be electrically connected to the mobile device. Therefore, in this embodiment, in a mobile device in which the optical unit 1 is mounted, a space for disposing the connector to electrically connect the optical unit 1 is able to be made smaller, and as a result, the degree of freedom in design of the mobile device is able to be ensured.

In this embodiment, the width direction of the first band-shaped portion 10h is parallel to the up-down direction, and the first band-shaped portion 10h is pulled around along the first side 17a and the third side 17c of the case body 17. Moreover, in this embodiment, the width direction of the second band-shaped portion 11a is parallel to the up-down direction, and the second band-shaped portion 11a is pulled around along the second side 17b and the fourth side 17d. In addition, in this embodiment, the fourth board portion 10d connected to the first band-shaped portion 10h through the third board portion 10c and the board portion 11b connected to the second band-shaped portion 11a are electrically connected in the state where they overlap each other in the front-back direction on the first side 17a.

Thus, in this embodiment, the first band-shaped portion 10h, the fourth board portion 10d, and the second circuit board 11 are able to be disposed along the outer peripheral surface of the case body 17 in the front-back and left-right directions in a compact manner. Therefore, in this embodiment, the optical unit 1 is able to be reduced in size in the front-back and left-right directions. In addition, in this embodiment, the fourth board portion 10d is constituted by a single-layer flexible printed circuit board, and the thickness of the fourth board portion 10d is small and thus, even if the fourth board portion 10d and the board portion 11b overlap in the front-back direction on the first side 17a, the optical unit 1 is able to be reduced in size in the front-back direction.

In this embodiment, the fifth board portion 10e is pulled out toward the front side from the center part in the left-right direction of the first side 17a. In addition, in this embodiment, the fourth board portion 10d and the board portion 11b are connected in the state where they overlap each other on the left side of the fifth board portion 10e on the first side 17a. Thus, in this embodiment, a distance between the fifth board portion 10e and the board portion 11b in the left-right direction is able to be made shorter. Therefore, in this embodiment, the length (length in the left-right direction) of the fourth board portion 10d is able to be made shorter and as a result, a cost of the first circuit board 10 is able to be reduced. In addition, in this embodiment, since the length of the fourth board portion 10d is able to be made shorter, wiring resistance between the fifth board portion 10e and the board portion 11b is able to be lowered.

In this embodiment, the rigidity of the board portion 11b disposed on the rear side of the fourth board portion 10d is higher than the rigidity of the fourth board portion 10d. Thus, in this embodiment, deformation of the fourth board portion 10d and the board portion 11b is able to be suppressed, when the fourth board portion 10d is soldered and connected to the board portion 11b from the front side in assembling of the optical unit 1. Therefore, in this embodiment, occurrence of nonconformity such as a crack in a connection part between the fourth board portion 10d and the board portion 11b is able to be prevented.

The embodiment described above is an example of a preferred embodiment of at least an embodiment of the disclosure but it is not limiting, and various modifications are able to be made within a range not changing the gist of at least an embodiment of the disclosure.

In the embodiment described above, at least any one of the first board portion 10a, the third board portion 10c, and the sixth board portion 10f may be constituted by a flexible printed circuit board. In other words, the entire first circuit board 10 may be constituted by a flexible printed circuit board. In addition, in the embodiment described above, at least any one of the second board portion 10b, the fourth board portion 10d, and the fifth board portion 10e may be constituted by a flexible printed circuit board and a rigid board.

In the embodiment described above, the first board portion 10a, the second board portion 10b, the third board portion 10c, the fourth board portion 10d, the fifth board portion 10e, and the sixth board portion 10f are provided integrally, but it may be so configured that the first board portion 10a is provided as a separate unit, and the first board portion 10a and the second board portion 10b are soldered and connected. Also, for example, the second board portion 10b, the third board portion 10c, the fourth board portion 10d, and the fifth board portion 10e may be provided separately, and the second board portion 10b, the fourth board portion 10d, and the fifth board portion 10e may be soldered and connected to the third board portion 10c.

In the embodiment described above, the second circuit board 11 may be a rigid-flexible board in which a flexible printed circuit board and a rigid board are integrated. In this case, for example, the part of the second band-shaped portion 11a where the first drive coil 25 is mounted, the part of the second band-shaped portion 11a where the second drive coil 27 is mounted or the board portion 11b are constituted by a flexible printed circuit board and a rigid board.

In the embodiment described above, the fourth board portion 10d and the board portion 11b may be electrically connected on the fourth side 17d while overlapping each other in the left-right direction. In this case, the length of a part of the second band-shaped portion 11a, which is disposed along the fourth side 17d, is short. Also, the board portion 11d is connected to the front end of the second band-shaped portion 11a and is pulled around along the fourth side 17d. The fourth board portion 10d is pulled around along the first side 17a to the left end of the first side 17a and bent by 90° and then, pulled around to the rear side, for example. In addition, when the fourth board portion 10d and the board portion 11b are electrically connected in the state where they overlap each other on the fourth side 17d, the fifth board portion 10e may be pulled out from the left end part of the first side 17a toward the front side.

Moreover, in the embodiment described above, when the second board portion 10b is pulled out toward the front side from the first board portion 10a, the fourth board portion 10d and the board portion 11b may be electrically connected while overlapping each other in the left-right direction on the third side 17c, or the fourth board portion 10d and the board portion 11b may be electrically connected in the state where they overlap each other in the front-back direction on the second side 17b. In this case, for example, the fifth board portion 10e is pulled out from the third side 17c toward the right side.

In the embodiment described above, the second circuit board 11 may include a drawer portion that is pulled out toward the outer peripheral side of the fixed body 5. In this case, the first circuit board 10 does not include the fifth board portion 10e or the sixth board portion 10f. Moreover, in the embodiment described above, the outer shape of the case body 17 may be rectangular when viewed from the up-down direction. In this case, the outer shape of the cover member 18 when viewed from the up-down direction is also rectangular. Furthermore, in the embodiment described above, the fourth board portion 10d may be disposed on the rear side of the board portion 11b.

In the embodiment described above, the optical unit 1 may include a rotation mechanism for rotating the camera module 2 with respect to the intermediate member 4 with the optical axis L of the camera module 2 as the rotation center. In this case, the rotation mechanism includes a drive coil mounted on the second circuit board 11 and a drive magnet disposed opposing the drive coil. Also, in this case, the intermediate member 4 includes a first intermediate member and a second intermediate member. The movable body 3 is rotatable with respect to the first intermediate member with the optical axis L of the camera module 2 as the rotation center, and the first intermediate member is rotatable with respect to the second intermediate member with the first axis L1 as the rotation center. Moreover, in the embodiment described above, the optical unit 1 may be mounted in various devices other than the mobile devices.

In the optical unit with a shake correction function of at least an embodiment of the disclosure, the first circuit board pulled out from the camera module and the second circuit board on which the first drive coil and the second drive coil are mounted are electrically connected by the first connection portion and the second connection portion which are electrically connected in an overlapping state. Moreover, in at least an embodiment of the disclosure, the drawer portion of the first circuit board or the second circuit board is pulled out toward the outer peripheral side of the fixed body.

Thus, in at least an embodiment of the disclosure, by providing a connector to which one drawer portion is connected in a mobile device or the like in which the optical unit with a shake correction function is mounted, the first circuit board and the second circuit board are able to be electrically connected to the mobile device or the like. Therefore, in at least an embodiment of the disclosure, in a mobile device or the like in which the optical unit with a shake correction function is mounted, a space for disposing the connector to electrically connect the optical unit with a shake correction function is able to be made smaller, and as a result, the degree of freedom in design of the mobile device or the like is able to be ensured.

Moreover, in at least an embodiment of the disclosure, the optical axis direction when the optical axis of the camera module is at the reference position and the width direction of the first band-shaped portion of the first circuit board are parallel, and the first band-shaped portion is pulled around along the first side and the third side, the optical axis direction when the optical axis of the camera module is at the reference position and the width direction of the second band-shaped portion of the second circuit board are parallel, and the second band-shaped portion is pulled around along the second side and the fourth side. Also, in at least an embodiment of the disclosure, either the first connection portion and the second connection portion are electrically connected while overlapping each other in the second direction on the first side or the second side or they are electrically connected while overlapping each other in the first direction on the third side or the fourth side.

Therefore, in at least an embodiment of the disclosure, the first band-shaped portion, the second band-shaped portion, the first connection portion, and the second connection portion are able to be disposed in a compact manner in the first direction and the second direction along the outer peripheral surface of the intermediate member holder. Therefore, in at least an embodiment of the disclosure, the optical unit with a shake correction function is able to be reduced in size in the first direction and the second direction. In other words, in at least an embodiment of the disclosure, the optical unit with a shake correction function is able to be reduced in size in the direction orthogonal to the optical axis direction of the camera module.

In at least an embodiment of the disclosure, for example, the first band-shaped portion and the second band-shaped portion are constituted by a flexible printed circuit board.

In at least an embodiment of the disclosure, it is preferable that the first circuit board includes the drawer portion, the drawer portion is pulled out from a center part of the first side toward one side in the second direction, and the first connection portion and the second connection portion are electrically connected on the first side closer to the one side in the first direction than the drawer portion while overlapping each other. By configuring as above, a length from the drawer portion to an end part of the first connection portion is able to be made shorter and thus, a cost of the first circuit board is able to be reduced. In addition, since the length from the drawer portion to the end part of the first connection portion is able to be made shorter, wiring resistance between the drawer portion and the end part of the first connection portion is able to be reduced. In addition, by configuring as above, a distance between the drawer portion and the second connection portion is able to be made shorter and thus, wiring resistance between the drawer portion and the second connection portion is able to be reduced.

In at least an embodiment of the disclosure, the first circuit board includes a connecting portion connecting an end part of the first band-shaped portion, an end part of the first connection portion, and an end part of the drawer portion, and the connecting portion is fixed to the intermediate member holder on the first side, for example.

In at least an embodiment of the disclosure, it is preferable that the first connection portion and the second connection portion are electrically connected while overlapping each other on the first side, and the second connection portion is disposed closer to the intermediate member holder side than the first connection portion in the second direction, and rigidity of the second connection portion is higher than rigidity of the first connection portion. By configuring as above, when the first connection portion and the second connection portion are soldered from an outer side in the second direction in the state where the first connection portion and the second connection portion overlap each other, for example, deformation of the first connection portion and the second connected portion is able to be suppressed. Therefore, occurrence of nonconformity such as a crack in a connection part between the first connection portion and the second connection portion is able to be prevented.

In at least an embodiment of the disclosure, the first connection portion is preferably constituted by a single-layer flexible printed circuit board with a wiring pattern provided only on one side. By configuring as above, a thickness of the first connection portion that overlaps the second connection portion on any one of the first side, the second side, the third side, and the fourth side is able to be reduced. Therefore, even if the first connection portion and the second connection portion overlap each other, the optical unit with a shake correction function is able to be reduced in size in the first direction or the second direction.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical unit with a shake correction function, comprising:
   a movable body having a camera module;
   an intermediate member rotatably holding the movable body;
   a fixed body rotatably holding the intermediate member;
   a first magnetic drive mechanism and a second magnetic drive mechanism to rotate the movable body with respect to the fixed body so that an optical axis of the camera module is inclined in an arbitrary direction; and
   a first circuit board and a second circuit board at least a part of which is constituted by a flexible printed circuit board, wherein
   the first magnetic drive mechanism comprises a first drive magnet and a first drive coil disposed to face each other in a first direction orthogonal to the optical axis of the camera module when the optical axis of the camera module is at a predetermined reference position;
   the second magnetic drive mechanism comprises a second drive magnet and a second drive coil disposed to face each other in a second direction orthogonal to the optical axis of the camera module and the first direction when the optical axis of the camera module is at the reference position;
   the fixed body comprises an intermediate member holder rotatably holding the intermediate member;
   the first circuit board is pulled out from the camera module;
   the first drive coil and the second drive coil are mounted on the second circuit board;
   the first circuit board comprises a first band-shaped portion provided having an elongated band shape and a first connection portion to electrically connect the first circuit board and the second circuit board;
   the second circuit board comprises a second band-shaped portion provided having an elongated band shape and a second connection portion to electrically connect the first circuit board and the second circuit board;
   the first circuit board or the second circuit board comprises a drawer portion pulled out toward an outer peripheral side of the fixed body;
   as viewed from an optical axis direction being a direction of the optical axis of the camera module when the optical axis of the camera module is at the reference position, an outer shape of the intermediate member holder has a regular-square shape or a rectangular shape, and four sides constituting an outer peripheral surface of the intermediate member holder are parallel to the first direction or the second direction; and
   supposing that one of two sides of the intermediate member holder in parallel with the first direction is a first side, the other side of the two sides of the intermediate member holder in parallel with the first direction is a second side, one of two sides of the intermediate member holder in parallel with the second direction is a third side, and the other side of the two sides of the intermediate member holder in parallel with the second direction is a fourth side, the optical axis direction when the optical axis of the camera module is at the reference position and a width direction of the first band-shaped portion are in parallel, and the first band-shaped portion is pulled around along the first side and the third side;

the optical axis direction when the optical axis of the camera module is at the reference position and a width direction of the second band-shaped portion are in parallel, and the second band-shaped portion is pulled around along the second side and the fourth side; and the first connection portion and the second connection portion are either electrically connected while overlapping each other in the second direction on the first side or the second side or electrically connected while overlapping each other in the first direction on the third side or the fourth side.

2. The optical unit with a shake correction function according to claim 1, wherein
the first band-shaped portion and the second band-shaped portion are constituted by a flexible printed circuit board.

3. The optical unit with a shake correction function according to claim 1, wherein
the first circuit board comprises the drawer portion;
the drawer portion is pulled out from a center part of the first side toward one side in the second direction; and
the first connection portion and the second connection portion are electrically connected on the first side closer to one side in the first direction than the drawer portion while overlapping each other.

4. The optical unit with a shake correction function according to claim 3, wherein
the first circuit board comprises a connecting portion connecting an end part of the first band-shaped portion, an end part of the first connection portion, and an end part of the drawer portion; and
the connecting portion is fixed to the intermediate member holder on the first side.

5. The optical unit with a shake correction function according to claim 1, wherein
the first connection portion and the second connection portion are electrically connected while overlapping each other on the first side;
the second connection portion is disposed closer to the intermediate member holder side than the first connection portion in the second direction; and
rigidity of the second connection portion is higher than rigidity of the first connection portion.

6. The optical unit with a shake correction function according to claim 1, wherein
the first connection portion is constituted by a single-layer flexible printed circuit board with a wiring pattern provided only on one side.

* * * * *